United States Patent [19]

Kitagawa et al.

[11] Patent Number: 5,303,613
[45] Date of Patent: Apr. 19, 1994

[54] SHIFT CONTROL APPARATUS FOR AUTOMATIC TRANSMISSION FOR VEHICLE

[75] Inventors: Takeshi Kitagawa; Hiroshi Takuma; Shoji Kan; Yoichi Furuichi; Takahiro Taki, all of Kyoto, Japan

[73] Assignee: Mitsubishi Jidosha Kogyo Kabushiki Kaisha, Tokyo, Japan

[21] Appl. No.: 917,169

[22] Filed: Jul. 17, 1992

[30] Foreign Application Priority Data

Jul. 31, 1991 [JP] Japan .................................. 3-192357
Jun. 19, 1992 [JP] Japan .................................. 4-160486

[51] Int. Cl.$^5$ ............................................ B60K 41/00
[52] U.S. Cl. .................................................. 74/866
[58] Field of Search ................................ 74/866, 844

[56] References Cited

U.S. PATENT DOCUMENTS

| | | | |
|---|---|---|---|
| 4,663,991 | 5/1987 | Nakamura et al. | 74/844 X |
| 4,779,489 | 10/1988 | Haley | 74/844 |
| 4,998,449 | 3/1991 | Baba et al. | 74/844 |
| 5,024,125 | 6/1991 | Baba | 74/866 |
| 5,029,086 | 7/1991 | Yoshimura | 74/866 X |
| 5,069,084 | 12/1991 | Matsuno et al. | 74/844 |
| 5,079,971 | 1/1992 | Yoshimura et al. | 74/844 X |

FOREIGN PATENT DOCUMENTS

1-303349 12/1989 Japan .................................. 74/844

*Primary Examiner*—Dirk Wright
*Attorney, Agent, or Firm*—Abelman Frayne & Schwab

[57] ABSTRACT

Hydraulic pressure supplied to the frictional engaging element of an automotive transmission is corrected to a higher value in the event that the engine is started after a long standstill condition and the first speed ratio is selected, thereby reducing speed-shift shocks when the engine is started from a standstill condition and the first speed ratio is selected.

5 Claims, 9 Drawing Sheets

| Frictional engaging element \ Speed ratio | N, P | 1st | 2nd | 3rd | 4th | R |
|---|---|---|---|---|---|---|
| Front clutch 20 |  |  |  |  |  | ○ |
| Rear clutch 21 |  | ○ | ○ | ○ |  |  |
| 4th speed clutch 22 |  |  |  | ○ | ○ |  |
| Kickdown brake 23 |  |  | ○ | ○ | ○ |  |
| Low reverse brake 24 |  | ● |  |  |  | ○ |

SHIFT CONTROL APPARATUS FOR AUTOMATIC TRANSMISSION FOR VEHICLE

BACKGROUND OF THE INVENTION

This invention relates to a shift control apparatus used in an automatic transmission for a vehicle having at least one frictional engaging element and a electromagnetic valve to control the hydraulic pressure supplied to the frictional engaging element, achieving a predetermined speed ratio by engaging the frictional engaging element, in which speed-shift shocks when an engine is started after a longtime standstill condition and a first shift is performed are reduced.

The automatic transmission for a vehicle selectively supplies hydraulic fluid to frictional engaging elements such as clutches and brakes to connect a desired rotary element in its gear system to an input shaft of the transmission or fix the element to a transmission casing, thereby automatically changing the speed ratio according to operation conditions of the vehicle.

Such an automatic transmission for a vehicle is required to be small in speed-shift shocks to protect various parts and components and maintain comfortable drive feeling. For this purpose, an automatic transmission for a vehicle has been proposed which uses a proper electronic control over the hydraulic pressure and its supply timing to frictional engaging elements, aiming for reduced speed-shift shocks.

Figure 10:
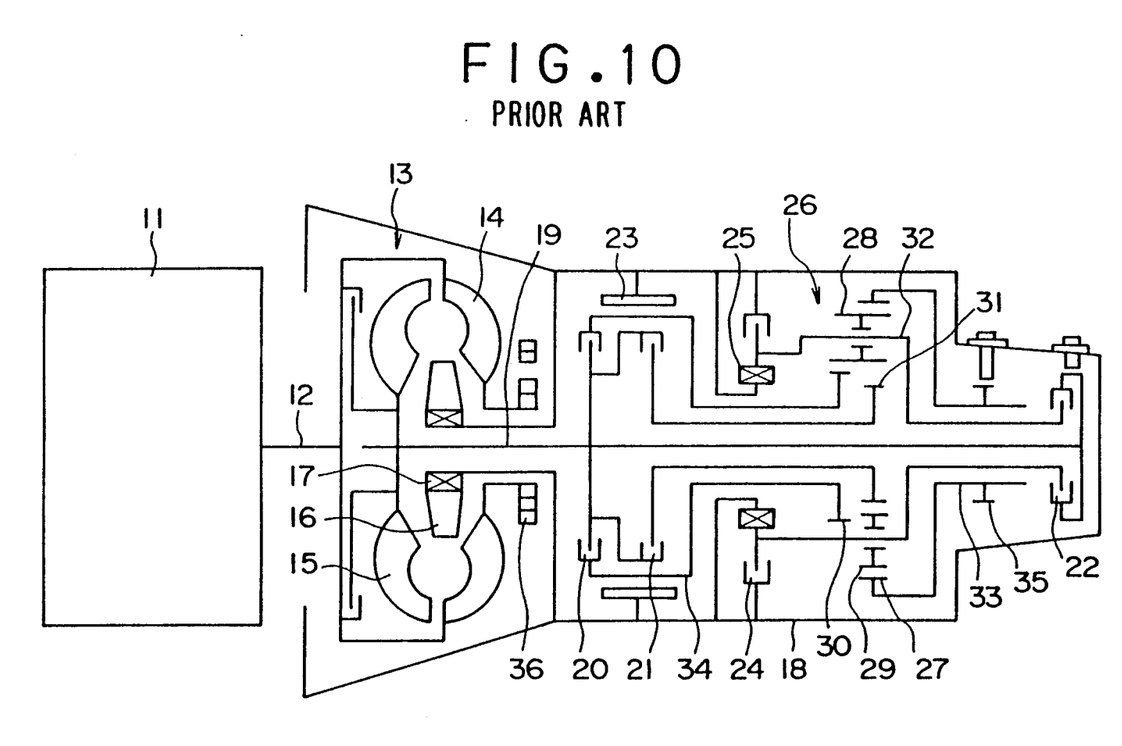
FIG. 10 is a skeletal view showing the structure of a prior art automatic transmission for a vehicle of four forward speeds used in the present invention.

An example of the structure of such an automatic transmission for a vehicle is shown in FIG. 10.

Referring to FIG. 10, a crank shaft 12 of an engine 11 is integrally connected with an impeller 14 of a torque converter 13. The torque converter 13 has the impeller 14, a turbine 15, a stator 16, and a one-way clutch 17. The stator 16 is connected to a transmission casing 18 through the one-way clutch 17. By the function of the one-way clutch 17, the stator is allowed to rotate in the same direction as the crank shaft 12 but is not allowed to rotate in the reverse direction. The torque transmitted to the turbine 15 is transmitted to an input shaft 19 of a gear transmission apparatus (hereinafter referred to as the "transmission input shaft") to achieve four forward speeds and a single reverse speed disposed at the rear of the torque converter 13.

The gear transmission apparatus comprises three clutches 20, 21, and 22, two brakes 23 and 24, one one-way clutch 25, and one ravigneaux type planetary gear mechanism 26. The ravigneaux type planetary gear mechanism 26 comprises a ring gear 27, a long pinion gear 28, a short pinion gear 29, a front sun gear 30, a rear sun gear 31, and a carrier 32. The carrier 32 rotatably supports the pinion gears 28 and 29 and is rotatably engaged with the transmission input shaft 19.

The ring gear 27 is connected to a transmission output shaft 33. The front sun gear 30 is connected to the transmission input shaft 19 through a kickdown drum 34 and a front clutch 20. Furthermore, the rear sun gear 31 is connected to the transmission input shaft 19 through a rear clutch 21. The carrier 32 is connected to a transmission casing 18 through a low reverse brake 24 and the one-way clutch 25 and to the transmission input shaft 19 through a 4th-speed clutch 22 disposed at the rear end of the gear transmission apparatus. The kickdown drum 34 is integrally connectable to the transmission casing 18 by a kickdown brake 23. Torque passed through the ravigneaux type planetary gear mechanism 26 is transmitted from a drive gear 35 mounted to the transmission output shaft 33 to the drive shaft side of driving wheels (not shown).

The clutches 20 to 22 and the brakes 23 and 24 as frictional engaging elements individually comprise hydraulic mechanisms provided with engaging piston devices or servo mechanisms. These hydraulic mechanisms are operated through a hydraulic control unit (not shown) by hydraulic fluid generated by an oil pump 36 connected to the impeller 14 of the torque converter 13.

Detailed structure and functions of the mechanisms are already known, for example, in Japanese Patent Publication Laid-open 58-46248/1983, 58-54270/1983, or 61-31749/1986. Thus, selective engagement of various frictional engaging elements is achieved according to the position of a shift lever provided in the driver's seat of the vehicle (not shown) selected by the driver and operation conditions of the vehicle, and various speed ratios are automatically achieved through the hydraulic control unit according to instructions from an electronic control unit to control the operation conditions of the engine 11.

Figure 11:
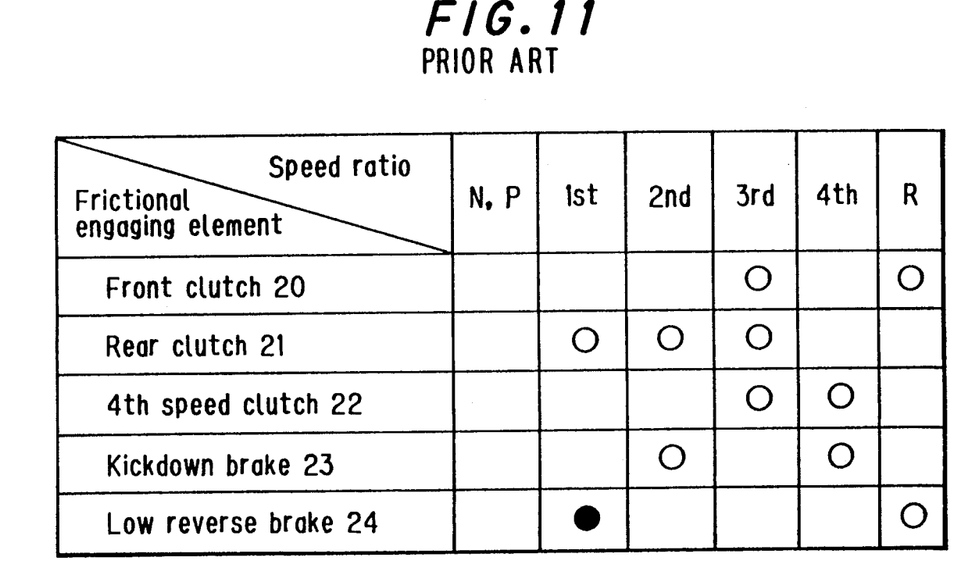
FIG. 11 is an operation element chart showing the relationship between the engaging condition of individual frictional engaging elements and speed ratios in FIG. 10.

The select pattern of the shift lever includes P (parking), R (reverse), N (neutral), D (automatic three forward speeds or automatic four forward speeds), 2 (automatic two forward speeds), and L (fixed to the 1st speed) positions. With the shift lever set to the D position, when an auxiliary switch (over-drive switch, not shown) is operated, the automatic three forward speeds or the automatic four forward speeds can be selected. The functions of the individual functional engaging elements when the shift lever is set to the individual positions are shown in FIG. 11. In the figure, symbol "○" indicates that an engagement condition is by hydraulic operation, and symbol "●" indicates that the engaging is achieved only when the L position is selected.

Figure 3:
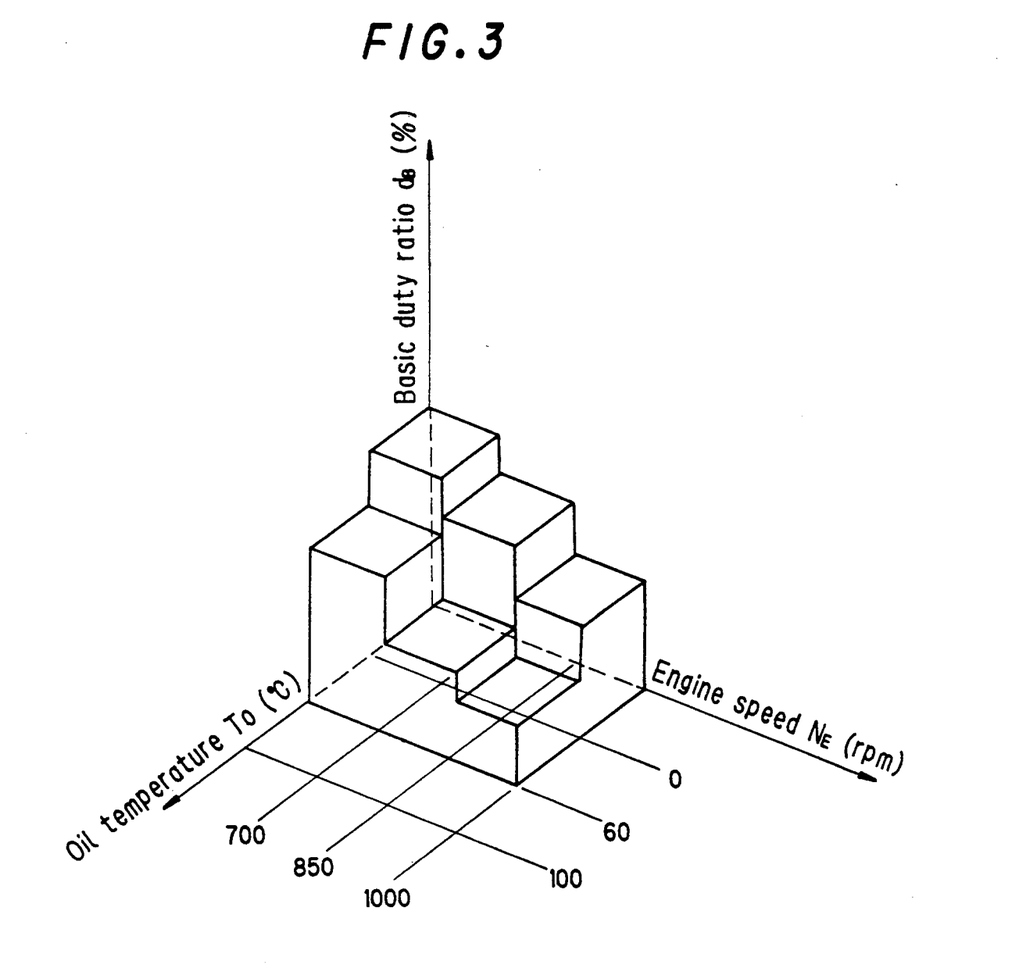
FIG. 3 is a three-dimensional graph showing the relationship between an automatic transmission oil temperature and an engine speed and a basic duty ratio of the a hydraulic pressure control valve when a shift lever is operated from the N position to the D position or from the P position to the R position.

With the vehicle in standstill, when the shift lever is operated from the N position to a running position, that is, to the D position or the R position, an engaging hydraulic pressure $P_0$ to a frictional engaging element to achieve the speed ratio is replaced with a target duty ratio $d_0$ of a hydraulic pressure control valve incorporated in the hydraulic control unit to adjust the engaging hydraulic pressure $P_0$ and controlled. In this case, the target duty ratio $d_0$ is set according to a basic duty ratio $d_B$ read from a three-dimensional graph as shown in FIG. 3 using an oil temperature $T_0$ of automatic transmission oil and an engine speed $N_E$, for example, as variables. Thus, a predetermined engaging hydraulic pressure $P_0$ as shown in FIG. 4 corresponding to the target duty ratio $d_0$ which is set according to the basic duty ratio $d_B$ is supplied to the frictional engaging element.

Figure 4:
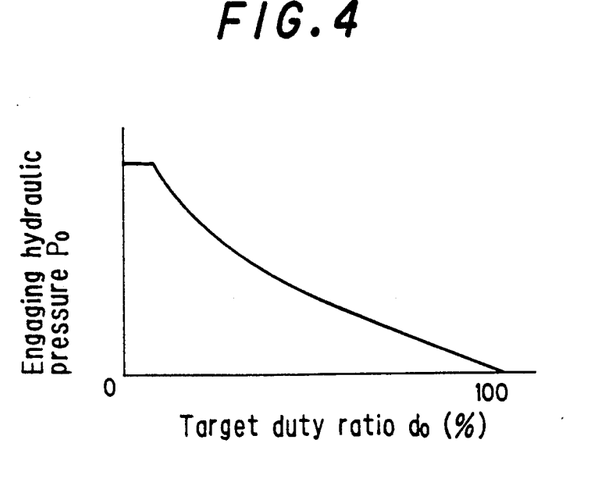
FIG. 4 is a graph showing the relationship between the target duty ratio of the hydraulic pressure control valve and the engaging hydraulic pressure of the frictional engaging element when the shift lever is operated from the N position to the D position or from the P position to the R position.

FIG. 4 shows an example where a hydraulic pressure control valve of a type which closes when unenergized to control the engaging hydraulic pressure $P_0$ is used. On the other hand, when a hydraulic pressure control valve of a type which opens when unenergized, the engaging hydraulic pressure tends to decrease as the target duty ratio $d_0$ increases.

In a prior art automatic transmission for a vehicle shown in FIG. 10 and FIG. 11, in which the target duty ratio $d_0$ of the hydraulic pressure control valve incorporated in the hydraulic control unit is electronically controlled to adjust the engaging hydraulic pressures $P_0$ to a plurality of frictional engaging elements, and these frictional engaging elements are selectively engaged to achieve a plurality of speed ratios, when the engine 11 is in a standstill condition over a long period of time, automatic transmission oil held in the oil path of the hydraulic control unit tends to fall down to an oil reservoir. As a result, when a running position is selected to start the vehicle immediately after the engine is started, automatic transmission oil does not spread over the entire oil path of a hydraulic pressure control circuit, and a delay in engagement tends to occur in the engaging side frictional engagement element with the engaging hydraulic pressure $P_0$ according to the normal basic duty ratio $d_B$ shown in FIG. 3, resulting in speed-shift shocks.

Figure 5:
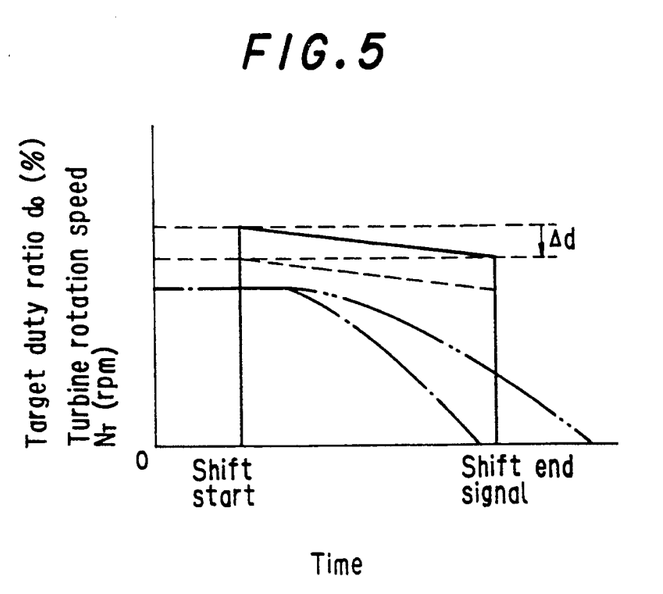
FIG. 5 is a graph showing an example of changes in the turbine rotation speed of the torque converter and the target duty ratio of the hydraulic pressure control valve during a shift.

Changes in the target duty ratio $d_0$ of the hydraulic pressure control valve and a rotation speed $N_T$ of the turbine 15 of the torque converter 13 are shown in FIG. 5.

As shown in FIG. 5, at the beginning of a shift, the target duty ratio $d_0$ of the hydraulic pressure control valve indicated by the solid line rises so that engagement of the engaging side frictional engaging element is slowly achieved. Then, the target duty ratio $d_0$ is reverted back to 0% and a shift end signal is transmitted. In this case, in a normal condition where automatic transmission oil is held in the oil path of the hydraulic control unit, the rotation speed $N_T$ of the turbine 15 of the torque converter 13 becomes zero during this time. Then, shift operation by the engagement of the engaging side frictional engaging element is completed, and speed-shift shocks almost do not occur.

However, after the engine is in a standstill condition for a long period of time, when a running position is selected to start the vehicle immediately after the engine is started, since automatic transmission oil held in the oil path of the hydraulic control unit has fallen down to the oil reservoir, a delay in supplying hydraulic oil to the engaging side frictional engaging element tends to occur when the running position is selected to start the vehicle immediately after the engine 11 is started. As a result, the rotation speed $N_T$ of the turbine 15 of the torque converter 13 is not zero when the shift end signal is transmitted. Changes in the rotation speed $N_T$ of the turbine 15 of the torque converter 13 are shown by the solid line in the figure. Thus, after a while from the transmission of the shift end signal, the rotation speed $N_T$ of the turbine 15 of the torque converter 13 becomes zero, and the shift operation is substantially completed. As a result, speed-shift shocks occur in association with the delay in engagement of the engaging side frictional engaging element.

Such a problem tends to conspicuously occur in a vehicle equipped with a hydraulic control unit of long oil path, especially, a vehicle equipped with an automatic transmission for a large vehicle corresponding to a large-displacement engine.

OBJECT OF THE INVENTION

With a view to eliminate the above prior art problems with automatic transmissions for a vehicle, it is a primary object of the present invention to provide a shift control apparatus for use in an automatic transmission for a vehicle having at least one frictional engaging element and an electromagnetic valve to control the hydraulic pressure supplied to the frictional engaging element, achieving a predetermined speed ratio by engaging the frictional engaging element, in which speed-shift shocks when the engine is started after a longtime standstill condition and a first shift is performed are reduced.

SUMMARY OF THE INVENTION

In accordance with the present invention, in an automatic transmission for a vehicle having at least one frictional engaging element and an electromagnetic valve to control hydraulic pressure supplied to the frictional engaging element, achieving a predetermined speed ratio by engaging the frictional engaging element, a shift control apparatus comprises shift detection means for detecting that the speed ratio of the automatic transmission for the vehicle is changed over from a neutral position to the predetermined speed ratio, engine stop condition determination means for determining a standstill condition of the engine over a long period of time, engine start detection means for detecting a start of the engine, and electromagnetic valve control means for correcting the hydraulic pressure supplied to the frictional engaging element to a higher-pressure side only when the predetermined speed ratio is first selected after the engine is started from a standstill condition for a long period of time.

In this case, the engine stop detection means can be oil temperature detection means for detecting the temperature of automatic transmission oil, or clock means which starts operation when the engine stops and stops operating when the engine is started.

When the engine is in a standstill condition over a long period of time, automatic transmission oil in the oil path of the hydraulic control unit falls down to an oil reservoir.

From this condition, when the engine is started and the first speed ratio is selected by the driver, the hydraulic pressure supplied to the engaging side frictional engaging element to achieve the speed ratio is corrected to a value higher than a normal value, thereby rapidly supplying automatic transmission oil to the oil path of the hydraulic control unit.

Thus, with the shift control apparatus for an automatic transmission for a vehicle according to the present invention, the hydraulic pressure supplied to the frictional engaging element is corrected to a higher value only when the engine is started from a standstill condition over a long period of time and a first speed ratio is selected, automatic transmission oil can be rapidly supplied into the oil path of the hydraulic control unit. As a result, no delay occurs in the engagement timing of the engaging side frictional engaging element to achieve the speed ratio as in the normal case, thereby enabling shift operation with no speed-shift shocks.

DETAILED DESCRIPTION OF THE PREFERRED EMBODIMENTS

According to the present invention embodiment in which the shift control apparatus for an automatic transmission for a vehicle according to the present an automatic transmission of four forward speeds as shown in FIG. 10 and FIG. 11 will now be described.

In FIG. 10, A1 designates the hydraulic pressure valve and A2 designates the shift control apparatus.

In this embodiment, whether or not an engine 11 has been in a standstill condition over a long period of time is determined from an oil temperature $T_0$ of automatic transmission oil and a count time $T_1$ of a timer (not shown) which is counted up according to an OFF signal of an ignition key (not shown) and canceled by an ON signal of the ignition key. However, as will be described later, a longtime standstill condition of the engine 11 can also be determined from only the oil temperature $T_0$ of automatic transmission oil or from only the count time $T_1$ of the timer according to the ON/OFF signal of the ignition key.

Specifically, an oil temperature sensor (not shown) for detecting the oil temperature $T_0$ of automatic transmission oil and a timer (not shown) which is counted up according to an OFF signal of an ignition key (not shown) and canceled by an ON signal of the ignition key are disposed at predetermined positions in the vehicle. Furthermore, an inhibitor switch (not shown) for detecting the position of a shift lever (not shown) and an engine speed sensor (not shown) for detecting an engine speed $N_E$ are disposed at predetermined positions in the vehicle. Detection signals from the oil temperature sensor, inhibitor switch, and engine speed sensor and the count time of the timer are outputted to an electronic control unit which controls the operation conditions of the engine 11.

After the engine 11 is started, the electronic control determines that the engine 11 has been in a standstill condition over a long period of time when the oil temperature $T_0$ according to the detection signal from the oil temperature sensor is lower than 60° C. and the count time $T_1$ of the timer from the ignition key OFF exceeds 4 hours, and with this condition, only when it is determined that the R position or the D position as a running position is first selected according the detection signal from the inhibitor switch, a correction duty ratio $\Delta d$ of the hydraulic pressure control valve is set to $-10\%$ in this embodiment.

In this case, the basic duty ratio $d_B$ of the hydraulic pressure control valve is read from, for example, a three-dimensional graph as shown in FIG. 3 which is previously set according to the oil temperature $T_0$ and the engine speed $N_E$. Then, the basic duty ratio $d_B$ and the correction duty ratio $\Delta d$ are added to calculate the target duty ratio $d_0$ by the following equation:

$$d_0 = d_B + \Delta d$$

In this case, when the oil temperature $T_0$ is above 60° C., since not much time has elapsed after the ignition key OFF and hydraulic fluid to the engaging side frictional engaging element has almost not fallen down, the vehicle may be run immediately after the engine is started. Similarly, when the count time $T_1$ of the timer is less than 4 hours, since a sufficient amount of automatic transmission oil is held in the oil path of the hydraulic control unit, the correction duty ratio $\Delta d$ to the duty ratio of the hydraulic pressure control valve is set to 0% to perform a normal control.

Figure 1:
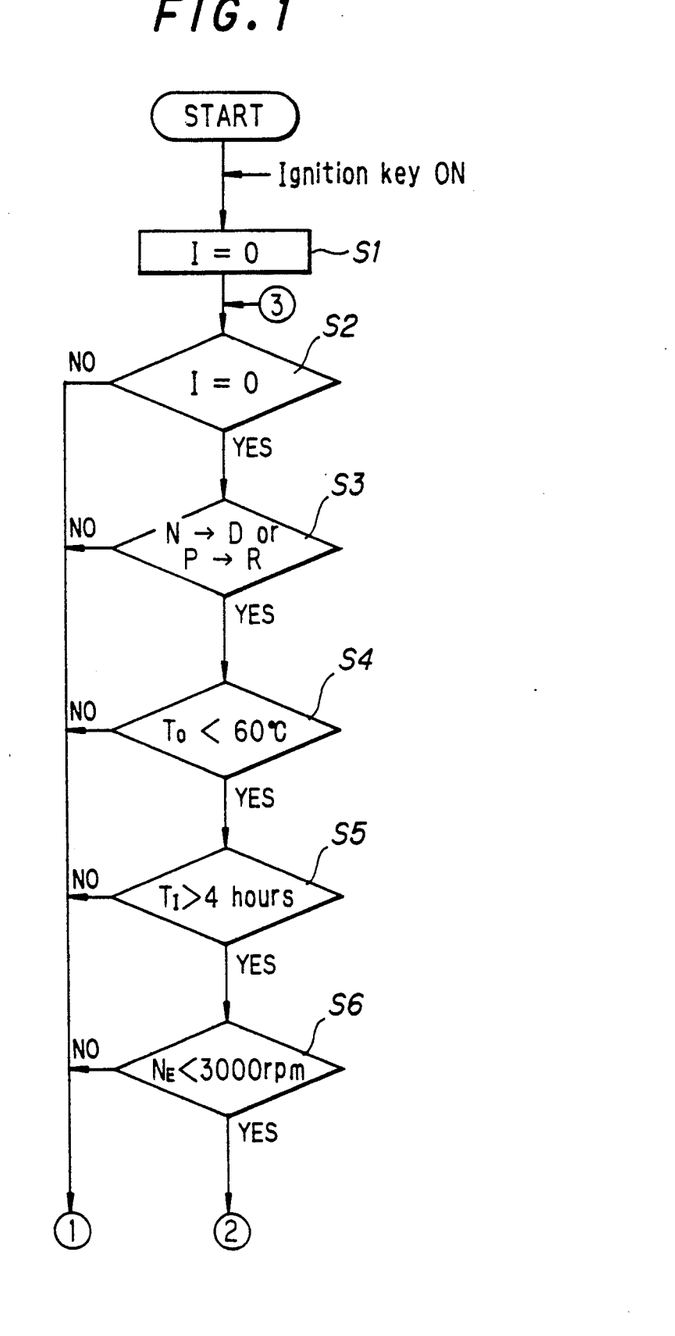
FIG. 1 is a flow chart showing the control flow of an early stage in an embodiment of the shift control apparatus for an automatic transmission for a vehicle according to the present invention.
Figure 2:
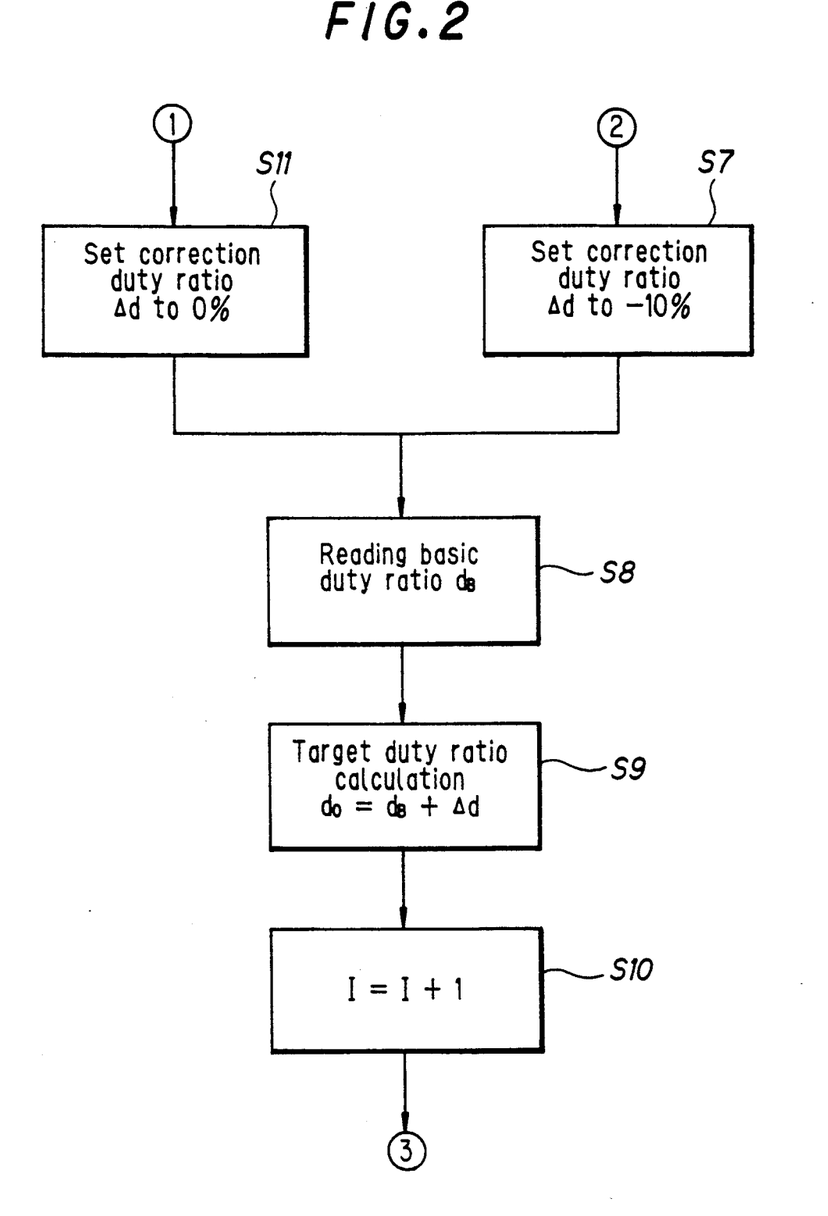
FIG. 2 is a flow chart showing the control flow of a late stage in an embodiment of the shift control apparatus for an automatic transmission for a vehicle according to the present invention.

The control flow of this embodiment is shown in FIG. 1 and FIG. 2.

Referring to FIG. 1 and FIG. 2, when the ON signal of the ignition key is outputted, in step S1 the electronic control unit set a count I of a shift counter, which indicates the presence of the first operation of the shift lever after ON operation of the ignition key, to zero, and determination is made in step S2 as to whether or not the count I is zero. Since the count I is zero immediately after the engine is started, determination is made in step S3 as to whether the shift lever is operated from the N position to the D position or from the P position to the R position.

When it is determined in step S3 that the shift lever is operated from the N position to the D position or from the P position to the R position, that is, the engine 11 is started and the first running speed ratio is selected, determination is made in step S4 as to whether or not the oil temperature $T_0$ of automatic transmission oil is below 60° C.

When it is determined in step S4 that the oil temperature $T_0$ of automatic transmission oil is below 60° C., that is, a certain period of time has elapsed from the ignition key OFF, determination is made in step S5 as to whether or not the count time $T_1$ of the timer exceeds 4 hours.

When it is determined in step S5 that the count time $T_1$ of the timer exceeds 4 hours, that is, the engine 11 has been a standstill condition for a long period of time and automatic transmission oil in the oil path of the hydraulic control unit has almost fallen down to the oil reservoir, determination is made in step S6 as to whether or not the engine speed $N_E$ is less than 3,000 rpm.

The reason why determination is made in step S6 as to whether or not the engine speed $N_E$ is less than 3,000 rpm is that, even if it is determined in step S5 that the engine has been in a standstill condition over a long period of time, when the engine speed $N_E$ is high to some extent, hydraulic pressure supplied to the hydraulic control unit will be sufficiently high. Under this condition, if normal control is performed to set the correction duty ratio $\Delta d$ for the duty ratio of the hydraulic pressure control valve to 0%, no delay occurs in the engaging side frictional engaging element, and normal control can be continued.

When it is determined in step S6 that the engine speed $N_E$ is less than 3,000 rpm, that is, if a shift operation is performed under this condition, there is the possibility that engaging hydraulic pressure of the engaging side frictional engaging element does not rapidly rise, and speed-shift shocks may occur due to a delay in engagement, in step S7 the correction duty ratio $\Delta d$ is set to $-10\%$. Then, in step S8, the basic duty ratio $d_B$ is determined from a graph shown in FIG. 3 according to the engine speed $N_E$ and the oil temperature $T_0$ of automatic transmission oil, the target duty ratio $d_0$ is calculated in step S9, and the engaging hydraulic pressure $P_0$ to the engaging side frictional engaging element is controlled according to the target duty ratio $d_0$.

Changes at this time in the target duty ratio $d_0$ of the hydraulic pressure control valve are indicated by the broken line in FIG. 5. As can be seen from FIG. 5, since the engaging hydraulic pressure is higher than that for normal shift control indicated by the solid line, the rotation speed $N_T$ of the turbine 15 varies as indicated by the dot-bar line, which becomes zero immediately before the shift end signal is outputted, resulting in almost no speed-shift shocks.

After that, in step S10, count I of the shift counter is incremented by one, and the processing returns to step S2.

On the other hand, when it is determined in step S2 that the count I is not zero, that is, after the engine 11 is started, a shift operation to the first running speed ratio has already been performed, or when it is determined in step S3 that the operation of the shift lever is not from the N position to the D position nor from the P position to the R position, or when it is determined in step S4 that the oil temperature $T_0$ of automatic transmission oil is above 60° C., that is, almost no time has elapsed after the ignition key OFF, or when it is determined in step S5 that the count time $T_1$ is within 4 hours, that is, automatic transmission oil is still held in the oil path of the hydraulic control unit, or when it is determined in step S6 that the engine speed $N_E$ is greater than 3,000 rpm, that is, the engaging hydraulic pressure of the engaging side frictional engaging element can be raised even if the shift operation is performed in this condition, in step S11 the correction duty ratio $\Delta d$ is set to 0%, and the processing goes to step S8.

Thus, in the above cases, the target duty ratio $d_0$ is set by only the basic duty ratio $d_B$ as in conventional cases, and a normal shift operation is performed.

Recent vehicles equipped with an automatic transmission for a vehicle incorporate a shift lock mechanism to inhibit ON operation of the ignition key other than at the P position. In such a vehicle, hydraulic fluid is supplied to the hydraulic circuit to achieve a reverse position during running with the D position, no problem occurs even if the shift lever is operated from the N position to the R position even with the normal control. Therefore, it is sufficient to consider the correction duty ratio $\Delta d$ only when the shift lever is operated from the N position to the D position or from the P position to the R position.

In the above-described embodiment, whether or not the engine 11 has been in a standstill condition over a long period of time is determined from the oil temperature $T_0$ of automatic transmission oil and the count time $T_1$ of the timer according to the ignition key ON/OFF signal. However, alternatively, it is also possible to determine a long standstill condition of the engine 11 from only the oil temperature $T_0$ of automatic transmission oil.

Figure 6:
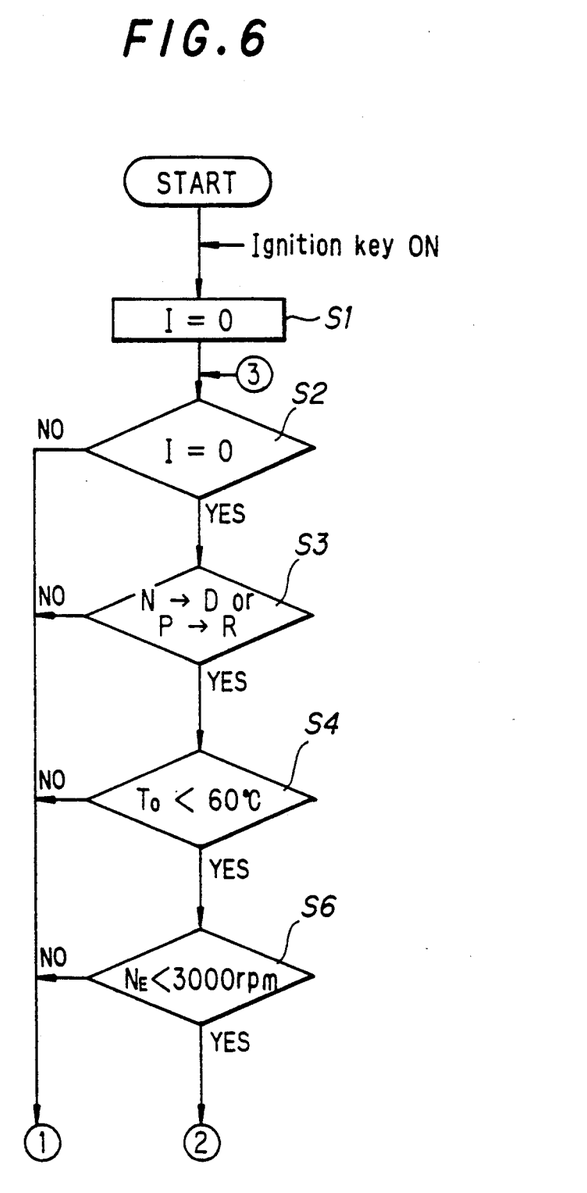
FIG. 6 is a flow chart showing the control flow of an early stage in another embodiment of the shift control apparatus for an automatic transmission for a vehicle according to the present invention.

Such a control flow in the early stage in another embodiment according to the present invention is shown in FIG. 6.

In FIG. 6, procedures from step S1 to step S4 are the same as those in the previous embodiment. When it is determined in step S4 that the oil temperature $T_0$ of automatic transmission oil is below 60° C., that is, the engine 11 has been in a standstill condition over a long period of time, determination is made in step S6 as to whether or not the engine speed $N_E$ is less than 3,000 rpm.

Figure 7:
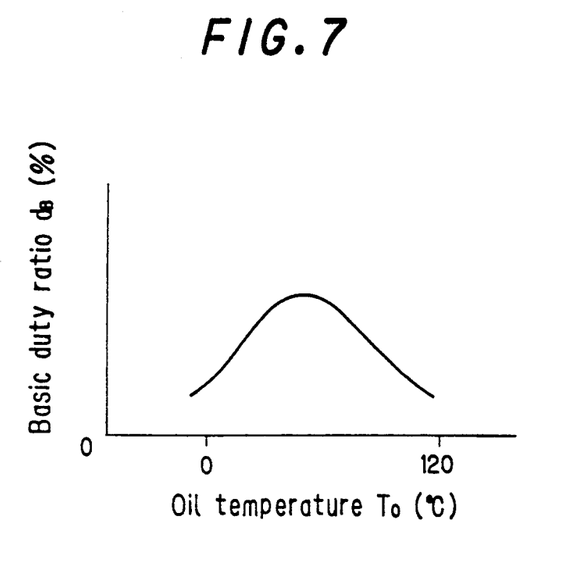
FIG. 7 is a graph showing the relationship between the automatic transmission oil temperature and a basic duty ratio in another embodiment of the present invention shown in FIG. 6.

Procedures from step S6 to step S11 shown in FIG. 2 are the same as those in the previous embodiment. In other words, in the control procedure of this embodiment, the determination step in step S5 is omitted from the previous embodiment shown in FIG. 1 and FIG. 2. In this embodiment, the basic duty ratio $d_B$ is read form a graph which is previously set according to the oil temperature $T_0$ of automatic transmission oil as shown in FIG. 7. However, in this embodiment, the engine speed $N_E$ is also detected, it is also possible to read from a three-dimensional graph as shown in FIG. 3 of the previous embodiment.

In an embodiment shown in FIG. 6 and FIG. 7, whether or not the engine 11 has been in a standstill condition over a long period of time is determined from only the oil temperature $T_0$ of automatic transmission oil. However, it is also possible to determine a long standstill condition of the engine 11 only from the count time $T_1$ of the timer which is canceled by the ignition key ON signal.

Figure 8:
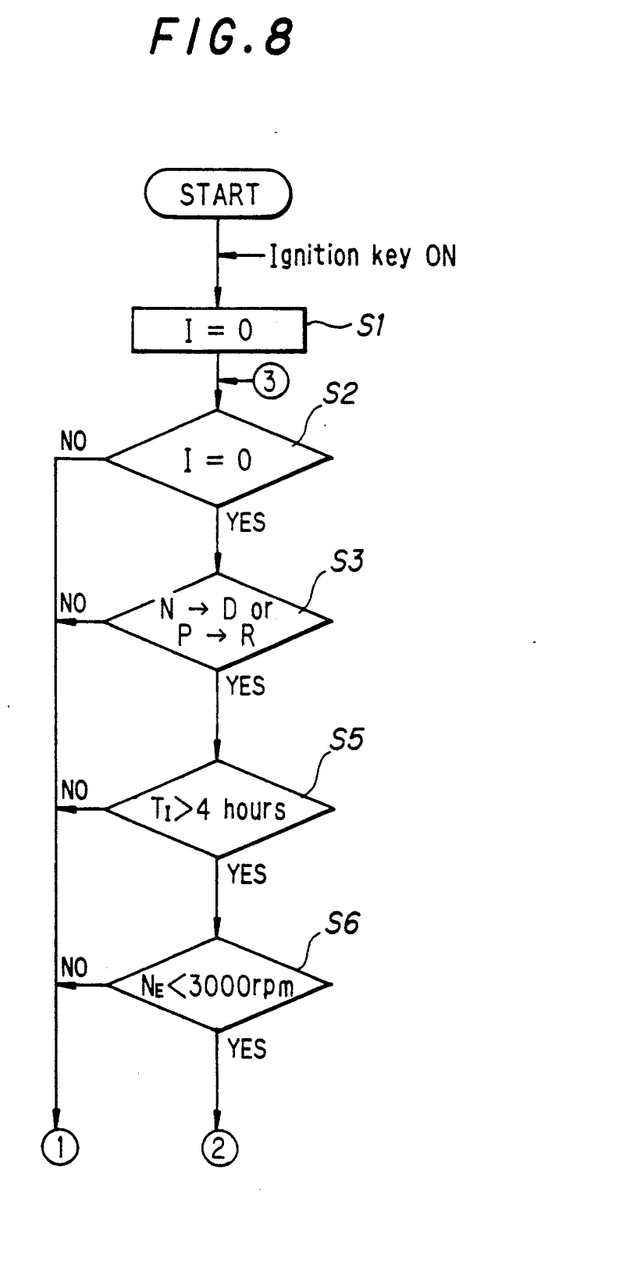
FIG. 8 is a flow chart showing the control flow of an early stage in another embodiment of the shift control apparatus for an automatic transmission for a vehicle according to the present invention.

Control flow in another embodiment according to the present invention is shown in FIG. 8.

Figure 9:
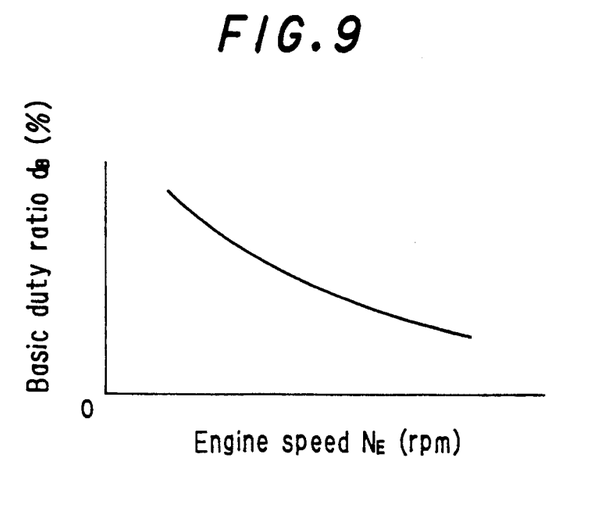
FIG. 9 is a graph showing the relationship between the engine speed and the basic duty ratio in another embodiment of the present invention shown in FIG. 8.

In FIG. 8, step S1 to step S3 are the same as those in the previous embodiment. When it is determined in step S3 that the shift lever is operated from the N position to the D position or from the P position to the R position, that is, the engine 11 is started and the first running speed ratio is selected, determination is made in step S5 as to whether or not the count time $T_1$ of the timer exceeds 4 hours.

when it is determined in step S5 that the count time $T_1$ of the timer exceeds 4 hours, that is, the engine 11 has been in a standstill condition over a long period of time, the processing goes to step S6. Step S6 to step S11 shown in FIG. 2 are the same as those in the previous embodiment. In other words, in the control procedure of this embodiment, the determination step in step S4 in the first embodiment shown in FIG. 1 and FIG. 2 is omitted. In this embodiment, the basic duty ratio $d_B$ is read from a graph previously set according to the engine speed $N_E$ as shown in FIG. 9.

What is claimed is:

1. In a shift control apparatus of an automatic transmission for a vehicle connected to a prime mover, having at least one frictional engaging element and hydraulic pressure control means for controlling hydraulic pressure supplied to said frictional engaging element, achieving a predetermined speed ratio by engaging said frictional engaging element, said shift control apparatus comprising:

shift detection means for detecting that the speed ratio of the automatic transmission for the vehicle is changed over from a neutral position to the predetermined speed ratio;

engine stop condition determination means for determining a standstill condition of the prime mover over an extended period of time;

engine start detection means for detecting a start of the prime mover; and correction means for correcting said hydraulic pressure control means to correct the hydraulic pressure supplied to said frictional engaging element to a higher-pressure side only when a long standstill condition of the prime mover is determined and a speed shift from the neutral position to the predetermined speed ratio is first selected.

2. The shift control apparatus of claim 1 wherein said engine stop detection means has oil temperature condition determination means for detecting a temperature of automatic transmission oil, and the engine is determined to have been in a standstill condition over an extended period of time when detection value from said oil temperature detection means is less than a predetermined value.

3. The shift control apparatus of claim 1 wherein said engine stop condition determination means has clock means starting operation when the engine is stopped and stopping operation when the engine is started, and the engine is determined to have been in a standstill condition over a long period of time when a clock value from a stop to a next start of the engine is greater than a predetermined value.

4. The shift control apparatus of claim 1 wherein said engine stop condition determination means has oil temperature detection means for detecting a temperature of automatic transmission oil and clock means starting operation when the engine is stopped and stopping operation when the engine is started, and the engine is determined to have been in a standstill condition over an extended period of time when detection value from said oil temperature detection means is less than a predetermined value and a clock value from a stop to a next start of the engine is greater than a predetermined value.

5. The shift control apparatus of claim 1 further comprising engine speed condition determination means for detecting a rotation speed of the engine, wherein said electromagnetic valve control means inhibits correction of hydraulic pressure supplied to the frictional engaging element to the higher pressure side when said engine stop detection means determines the engine to have been in a standstill condition over an extended period of time and an output of said engine speed detection means is greater than a predetermined value.

* * * * *